(12) United States Patent
Al Alharith et al.

(10) Patent No.: US 11,913,319 B2
(45) Date of Patent: Feb. 27, 2024

(54) SANDSTONE STIMULATION

(71) Applicant: Saudi Arabian Oil Company, Dhahran (SA)

(72) Inventors: Abdullah M. Al Alharith, Al Khobar (SA); Mohammed Ali Alyami, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/845,706

(22) Filed: Jun. 21, 2022

(65) Prior Publication Data

US 2023/0407737 A1 Dec. 21, 2023

(51) Int. Cl.
*E21B 43/27* (2006.01)
*E21B 43/24* (2006.01)
*C09K 8/72* (2006.01)

(52) U.S. Cl.
CPC .............. *E21B 43/27* (2020.05); *C09K 8/72* (2013.01); *E21B 43/2405* (2013.01)

(58) Field of Classification Search
CPC ........ E21B 43/27; E21B 43/2405; C09K 8/72
See application file for complete search history.

(56) References Cited

U.S. PATENT DOCUMENTS

| | | | |
|---|---|---|---|
| 3,076,508 A | 2/1963 | Lissant | |
| 3,980,136 A | 9/1976 | Plummer et al. | |
| 4,003,818 A | 1/1977 | Juillard et al. | |
| 4,237,977 A | 12/1980 | Lutener | |
| 4,454,918 A | 6/1984 | Richardson et al. | |
| 4,564,997 A | 1/1986 | Matsuo | |
| 4,846,277 A | 7/1989 | Khalil et al. | |
| 5,495,891 A | 3/1996 | Sydansk | |
| 5,513,712 A | 5/1996 | Sydansk | |
| 5,515,924 A | 5/1996 | Osterhoudt | |
| 5,706,895 A | 1/1998 | Sydansk | |
| 6,516,885 B1 | 2/2003 | Munday | |
| 6,858,566 B1 | 2/2005 | Reddy et al. | |
| 7,080,688 B2 | 7/2006 | Todd et al. | |

(Continued)

FOREIGN PATENT DOCUMENTS

| | | |
|---|---|---|
| CN | 1556771 | 12/2004 |
| CN | 1681596 | 10/2005 |

(Continued)

OTHER PUBLICATIONS

Al-Nakhli et al., "A breakthrough water shutoff system for super-K zones in carbonate Ghawwar Field: Absorption and polymer system," SPE 179790, presented at the SPE EOR Conference at Oil and Gas West, Muscat, Oman, Mar. 2016, 22 pages.

(Continued)

*Primary Examiner* — Silvana C Runyan
(74) *Attorney, Agent, or Firm* — Fish & Richardson P.C.

(57) ABSTRACT

Acidizing a sandstone formation in Earth crust, including pumping ammonium salts (an ammonium salt not having fluoride and an ammonium salt having fluoride) and nitrite salt through a wellbore into a sandstone formation, pumping an acid through the wellbore into the sandstone formation, generating heat, nitrogen gas, and hydrofluoric acid from reaction of the ammonium salts with the nitrite salt and the acid in the sandstone formation, and acidizing the sandstone formation with the hydrofluoric acid.

18 Claims, 5 Drawing Sheets

(56) References Cited

U.S. PATENT DOCUMENTS

| | | |
|---|---|---|
| 7,199,083 B2 | 4/2007 | Zevallos |
| 7,404,442 B2 | 7/2008 | Dahanayake et al. |
| 9,293,750 B2 | 3/2016 | Yang et al. |
| 9,695,353 B2 | 7/2017 | Nelson et al. |
| 10,125,305 B2 | 10/2018 | Al Moajil et al. |
| 10,150,905 B1 | 12/2018 | Reddy |
| 10,365,564 B2 | 7/2019 | Cha et al. |
| 10,761,428 B2 | 9/2020 | Cha et al. |
| 10,926,227 B2 | 2/2021 | Cha et al. |
| 10,934,468 B2 | 3/2021 | Reddy |
| 10,983,439 B2 | 4/2021 | Cha et al. |
| 11,111,753 B2 | 9/2021 | Almohsin et al. |
| 2004/0146803 A1 | 7/2004 | Kohl et al. |
| 2008/0105428 A1 | 5/2008 | Santra et al. |
| 2008/0182761 A1* | 7/2008 | Stephenson ............ C09K 8/74 507/104 |
| 2008/0246052 A1 | 10/2008 | Hsu |
| 2008/0314594 A1* | 12/2008 | Still ........................ C09K 8/72 166/307 |
| 2009/0084554 A1* | 4/2009 | Williamson ............ C09K 8/02 166/308.4 |
| 2009/0104564 A1 | 4/2009 | Yang |
| 2010/0330721 A1 | 12/2010 | Barlocchi et al. |
| 2011/0123771 A1 | 5/2011 | Stavis et al. |
| 2011/0296903 A1 | 12/2011 | Han et al. |
| 2012/0267603 A1 | 10/2012 | Lee et al. |
| 2013/0029883 A1 | 1/2013 | Dismuke et al. |
| 2013/0125630 A1 | 5/2013 | Collins et al. |
| 2013/0126169 A1 | 5/2013 | Al-Nakhli et al. |
| 2013/0236698 A1 | 9/2013 | Stavis et al. |
| 2013/0316329 A1 | 11/2013 | Yu |
| 2014/0296185 A1 | 10/2014 | Jones et al. |
| 2014/0363623 A1 | 12/2014 | Sun et al. |
| 2016/0363600 A1 | 12/2016 | Sniadecki et al. |
| 2017/0067836 A1 | 3/2017 | Hull |
| 2017/0114242 A1 | 4/2017 | Lloyd et al. |
| 2019/0070566 A1* | 3/2019 | Kidambi et al. ...... B01D 69/125 |
| 2020/0301282 A1 | 9/2020 | Cha et al. |
| 2020/0362679 A1* | 11/2020 | Al-Nakhli ................ C09K 8/72 |
| 2021/0024809 A1 | 1/2021 | Geri et al. |
| 2021/0162352 A1 | 6/2021 | Cha et al. |

FOREIGN PATENT DOCUMENTS

| | | |
|---|---|---|
| CN | 101323780 | 12/2008 |
| CN | 101493006 | 7/2009 |
| CN | 101638979 | 2/2010 |
| CN | 102329599 | 1/2012 |
| CN | 102536166 | 7/2012 |
| CN | 106589225 | 4/2017 |
| CN | 108025909 | 5/2018 |
| CN | 111108440 | 5/2020 |
| EP | 2804923 | 11/2014 |
| JP | 2004193525 | 7/2004 |
| JP | 2006514413 | 4/2006 |
| JP | 2006520697 | 9/2006 |
| JP | 2009134255 | 6/2009 |
| JP | 2009539261 | 11/2009 |
| JP | 2010518615 | 5/2010 |
| JP | 2013527103 | 6/2013 |
| JP | 2015128818 | 7/2015 |
| JP | 6947482 | 10/2021 |
| KR | 20160014504 | 2/2016 |
| WO | WO 2009149362 | 12/2009 |
| WO | WO 2013078306 | 5/2013 |
| WO | WO 2015161205 | 10/2015 |
| WO | WO 2017009710 | 1/2017 |
| WO | WO 2019032903 | 2/2019 |

OTHER PUBLICATIONS

Ba Geri et al., "Different Techniques for Characterizing the Filter Cake," SPE 163960, presented at the SPE Middle East Unconventional Gas Conference and Exhibition, Muscat, Oman, Jan. 28-30, 2013, 13 pages.

Ba Geri et al., "Water Base Barite Filter Cake Using Non-Corrosive Agents," SPE 183653, presented the SPE Middle East Oil & Gas Show and Conference, Manama, Kingdom of Bahrain, Mar. 6-9, 2017, 8 pages.

Bageri et al., "Complex barite filter cake removal using in-situ generated acids by thermochemicals," Scientific Reports, Sep. 2020, 10:15773, 8 pages.

Becker et al., "Polymer microfluidic devices," Talanta, Feb. 11, 2002, 56(2), 21 pages.

Cai et al., "Experimental study of water wetting in oil-water two phase flow—Horizontal flow of model oil," Chemical Engineering Science, 2012, 73:334-344, 11 pages.

Chen et al., "Cake formation and growth in cake filtration," Powder Technology, 2009, 192:217-224, 8 pages.

Choi et al., "In-line coagulation with low-pressure membrane filtration," Water Research, May 2004, 38:4271-4281, 11 pages.

Dolan et al., "Factors influencing optimal micro-screen drum filter selection for recirculating aquaculture systems," Aquacultural Engineering, 2013, 56:42-50, 9 pages.

Gray et al., "Optimized Reservoir Drill-In Fluid and Breaker System Design focused on Maximizing Productivity in Open-hole Completions," presented at the 2020 AADE Fluids Technical Conference and Exhibition, Houston, TX, Apr. 14-15, 2020, 8 pages.

Harris et al., "Effective water-based drill-in fluid filter cake cleanup by treatment fluids containing organic acid precursors," Cleansorb, White Paper, Aug. 2014, 15 pages.

Hutton et al., "Fusible-particle system helps to control severe lost circulation while drilling across a fractured zone in Elk Hills Field, CA," presented at the SPE Western Regional Meeting, San Jose, California, Mar. 2009, 12 pages.

Jilani et al., "Effect of overbalance pressure on formation damage," Journal of Petroleum Science and Engineering, 2002, 36:97-109, 13 pages.

Kameda et al., "Removal of polymeric filter cake in petroleum wells: A study of commercial amylase stability," Journal of Petroleum Science and Engineering, 2007, 59:263-270, 8 pages.

Kim et al., "Liquid-cell Transmission Electron Microscopy for Tracking Self-assembly of Nanoparticles," Journal of Visualized Experiments, 2017, 128, 10 pages.

Kim et al., "Potential of nanobubbles generated by ultrasonication in aqueous alkyl polyglycoside solutions," Journal of Colloid and Interface Science, 2000, 223:285-291, 7 pages.

Lee et al., "Site-Selective In Situ Grown Calcium Carbonate Micromodels with Tunable Geometry, Porosity and Wettability," Advanced Functional Materials, 26, Jul. 1, 2016, 10 pages.

Li et al., "Correlation between filter cake structure and filtration properties of model drilling fluids," SPE 28961, presented at the SPE International Symposium on Oilfield Chemistry, San Antonio, Texas, Feb. 1995, 11 pages.

Lifton, "Microfluidics: an enabling screening technology for enhanced oil recovery (EOR)," Lab on a Chip, Royal Society of Chemistry, May 21, 2016, 16(10), 20 pages.

Lu et al., "Fabrication of Nanostructure by Template Method in Microfluidics," Chinese Journal of Analytical Chemistry, 37(6), Jun. 1, 2009, 6 pages.

Mahmoud, "Well clean-up using a combined thermochemical/chelating agent fluids," J. Energy Resour. Technol. Trans., Oct. 2019, 141:102905, 6 pages.

Mo et al., "Formation and stability of ultrasonic generated bulk nanobubbles," Chinese Phys. B, 2018, 27, 118104, 8 pages.

Mohamed et al., "Removal of Calcium Carbonate Water-Based Filter Cake Using a Green Biodegradable Acid," Sustain, Jan. 2020, 12(3):994, 10 pages.

Ohgaki et al., "Physicochemical approach to nanobubble solutions," Chemical Engineering Science, 2010, 65:1296-1300, 5 pages.

Pu et al., "Liquid cell transmission electron microscopy and its applications," Royal Society Open Science, 2020, 24 pages.

Ren et al., "Materials for Microfluidic Chip Fabrication," Accounts of Chemical Research, 46(11), Jun. 11, 2013, 11 pages.

(56) References Cited

OTHER PUBLICATIONS

Robertson et al., "Nanoparticle Immobilization for Controllable Experiments in Liquid-Cell Transmission Electron Microscopy," ACS Applied Materials & Interfaces, 2018, 10:22801-22808, 8 pages.
Sander et al., "Template-Assisted Fabrication of Dense, Aligned Arrays of Titania Nanotubes with Well-Controlled Dimensions of Substrates," Advanced Materials, Nov. 2004, 16(22), 6 pages.
Savari et al., "Managing lost circulation in highly fractured, vulgular formations: Engineered usage of high fluid loss squeeze and reticulated foam lost circulation materials," presented at the IADC/SPE International Drilling Conference and Expedition, Galveston, Texas, Mar. 2020, 11 pages.
Schejbal et al., "Modelling of diesel filters for particulates removal," Chemical Engineering Journal, 2009, 154:219-230, 12 pages.
Shafiq et al., "Sandstone matrix acidizing knowledge and future development," Journal of Petroleum Exploration and Production Technology, 7(4), Feb. 2017, 1205-1216, 12 pages.
Song et al., "Chip-off-the-rock: the study of reservoir-relevant geological processes with real-rock micromodels," Royal Society of Chemistry, 2014, 14:4382-4390, 9 pages.
Spende et al., "TiO2, SiO2, and Al2O3 coated nanopores and nanotubes produced by ALD in etched ion-track membranes for transport measurements," Nanotechnology, Aug. 2015, 26, 12 pages.
Stolyarov et al., "Overcoming Challenges while Acidizing Sandstone Formation Successfully in the Gulf of Cambay, Offshore India," North Africa Technical Conference and Exhibition, Apr. 2013, 7 pages.
Tariq et al., "Reduction of Breakdown Pressure by Filter Cake Removal Using Thermochemical Fluids and Solvents: Experimental and Numerical Studies," Molecules, Jul. 2021, 26(15):4407, 21 pages.
Watson et al., "Foam sticks application to increase production and encapsulated inhibitors to mitigate corrosion & scale formation," SPE 156213, presented at the SPE Annual Technical Conference, Islamabad, Pakistan, Nov. 2011, 10 pages.
Zheng et al., "Surface Effect on Oil Transporation in Nanochannel: a Molecular Dynamics Study," Nanoscale Research letters, Jun. 2017, 12(1), 9 pages.
Zhu et al., "Applications of a novel lost circulation additive," presented at the International Petroleum Technology Conference, Mar.-Apr. 2021, 16 pages.
U.S. Appl. No. 17/569,226, filed Jan. 5, 2022, Al-Nakhli et al.
U.S. Appl. No. 17/657,901, filed Apr. 4, 2022, Al-Nakhli et al.
U.S. Appl. No. 17/705,914, filed Mar. 28, 2022, Al-Nakhli et al.
U.S. Appl. No. 17/705,956, filed Mar. 28, 2022, Al-Nakhli et al.
U.S. Appl. No. 17/706,116, filed Mar. 28, 2022, Al-Nakhli et al.

\* cited by examiner

SANDSTONE STIMULATION

TECHNICAL FIELD

This disclosure relates to acidizing sandstone formations.

BACKGROUND

A wellbore and associated subterranean formation in the Earth crust may be treated. The treatments may be to facilitate production of hydrocarbon, such as crude oil or natural gas, from the subterranean formation. Well stimulation is a technique to increase the flow of oil or gas from the reservoir, such as by dissolving rock or creating new channels (fractures) around the wellbore. Commonly applied stimulation techniques include, for example, acidizing and hydraulic fracturing.

When sandstone geological formations as the subterranean formation contain hydrocarbon (e.g., crude oil or natural gas, or both), the sandstone formation may be referred to as a sandstone reservoir. Sandstone reservoirs may include relatively stable minerals, and pores saturated with fluids. Sandstone may be a clastic sedimentary rock also known as arenite.

SUMMARY

An aspect relates to a method of acidizing a sandstone formation in Earth crust, the method including pumping ammonium salts (including an ammonium salt not having fluoride and an ammonium salt having fluoride) and nitrite salt through a wellbore into a subterranean formation (is or includes a sandstone formation), pumping an acid through the wellbore into the subterranean formation after pumping the ammonium salts and the nitrite salt through the wellbore into the subterranean formation, generating heat, nitrogen gas, and hydrofluoric acid from reaction of the ammonium salts with the nitrite salt and the acid in the subterranean formation, and acidizing the sandstone formation with the hydrofluoric acid, wherein the acidizing includes dissolving quartz in the sandstone formation with the hydrofluoric acid.

Another aspect is a method of acidizing a sandstone formation, including pumping an ammonium salt not having fluoride, an ammonium salt having fluoride, and a nitrite salt through a wellbore into a subterranean formation (including a sandstone formation) in Earth crust. The wellbore is formed through the Earth surface into the subterranean formation. The method includes pumping an acid through the wellbore into the subterranean formation, generating heat, nitrogen gas, and hydrofluoric acid from reaction of the ammonium salt not having fluoride, the ammonium salt having fluoride, the nitrite salt, and the acid, and acidizing the sandstone formation with the hydrofluoric acid, wherein the acidizing involves dissolving quartz in the sandstone formation with the hydrofluoric acid as generated.

Yet another aspect relates to a method of acidizing a sandstone formation in Earth crust, the method including pumping a first ammonium salt and a second ammonium salt through a wellbore into a subterranean formation, wherein the subterranean formation includes the sandstone formation. The method includes pumping a nitrite salt through the wellbore into the subterranean formation after pumping the first ammonium salt and the second ammonium salt through the wellbore into a subterranean formation. The method includes pumping an acid through the wellbore into the subterranean formation after pumping the nitrite salt through the wellbore into the subterranean formation to give a mixture of water, the first ammonium salt, the second ammonium salt, the nitrite salt, and the acid in the sandstone formation. The method includes generating heat, nitrogen gas, and hydrofluoric acid from reaction of the first ammonium salt, the second ammonium salt, the nitrite salt, and the acid. The method includes acidizing the sandstone formation with the hydrofluoric acid, wherein the acidizing includes dissolving quartz in the sandstone formation with the hydrofluoric acid as generated.

The details of one or more implementations are set forth in the accompanying drawings and the description below. Other features and advantages will be apparent from the description and drawings, and from the claims.

DETAILED DESCRIPTION

Aspects of the present disclosure are directed to sandstone acidizing. In embodiments, to acidize a sandstone formation (reservoir), an ammonium salt (e.g., $NH_4Cl$) not having fluoride, an ammonium salt having fluoride (e.g., $NH_4HF_2$ or $NH_4F$), a nitrite salt (e.g., $NaNO_2$), and an acid (e.g., hydrochloric acid, acetic acid, etc.) are pumped from surface (Earth surface) through a wellbore into the sandstone formation to give a mixture in the sandstone formation. The sandstone formation is a subterranean formation in the Earth crust.

Generated in-situ via the mixture in the sandstone formation includes heat and nitrogen ($N_2$) gas. Also generated via the mixture is hydrogen fluoride giving hydrofluoric acid (HF) in the aqueous environment. The in-situ generated hydrofluoric acid (HF) may be utilized for acidizing the sandstone formation.

Beneficially, [1] the in-situ generation of the HF avoids direct handling of HF (e.g., at surface), [2] the heat generated facilitates removal of formation damage that is organic deposits (e.g., wax, asphaltene, etc.), and [3] the nitrogen generation increases wellbore pressure (and near-wellbore pressure) displacing the mixture further into the sandstone formation. Moreover, the nitrogen generation may also advantageously promote flowback after treatment.

The term "HF" as a chemical formula is used herein to refer to hydrofluoric acid. In other words, the term "HF" as used herein refers to hydrogen fluoride as "hydrofluoric acid" in the aqueous environment. The carrier fluid conveying the mixture components from surface being or including water gives the aqueous environment. In addition, the mixture in-situ reaction generates water. Plus, existing wellbore fluid may be aqueous.

In general, acidizing may be applied to a well to stimulate the well to improve flow and to remove damage. The acid(s) in acidizing the subterranean formation may dissolve sediments and mud solids within pores that are inhibiting permeability of the rock. Acids may be applied, for example, to sandstone and carbonate formations to increase the formation permeability and porosity near the wellbore. These acids can dissolve different minerals, such as quartz, carbonates, and feldspar present in reservoir rocks, thereby increasing the permeability. The increased permeability may increase the production (e.g., flow rate and/or recovery) of hydrocarbon fluid from the formation through the wellbore to surface during subsequent production. The acidizing may enlarge natural pores of the reservoir, which may stimulate the flow of hydrocarbons. The acidizing may be guided by considerations of volumes and types of acid and procedures so to achieve beneficial removal of formation damage around the wellbore.

Acidizing is a technique (e.g., for oil and gas operators) for increasing productivity (stimulation) of wells for increased hydrocarbon production. Acidizing of subterranean formations (e.g., sandstone formations) may performed on new wells to increase their initial productivity and on aging wells to restore productivity and increase hydrocarbon recovery. The increased productivity may refer to increased production rate and increased recovery of hydrocarbons (e.g., crude oil or natural gas, or both) from the subterranean formation. Acidizing may involve pumping a treatment fluid (composition) into a wellbore or subterranean formation (geological formation) that is capable of producing crude oil and/or natural gas. A purpose of acidizing may be to increase well productivity or injectivity. Categories of acidizing can include acid washing, matrix acidizing, and fracture acidizing. The formation type may drive the type(s) of acid beneficial for acidizing. The formation permeability may determine pressure beneficial for pumping acidizing treatment fluid into the formation.

In the oil and gas industry, sandstone acidizing (acidizing of a sandstone formation or sandstone reservoir) is a stimulation technique to remove formation damage and therefore increase the production of oil and gas from the sandstone reservoir. In the acidizing, acid systems employed may include mud acid system (e.g., including a mixture of HF and hydrochloric acid), HF-organic acid system (including mixture of HF and organic acid), and HF-chelating agent system (including mixture of HF and chelating agent). The selection of the acid system for sandstone acidizing operations may depend on considerations, such as the geological structure of the formation, the temperature of reservoir, and the history of the treated well. The HF (hydrofluoric acid) is typically a main factor in sandstone acidizing. To avoid direct handling of HF, which is a hazardous acid, the HF may be generated, for example, by mixing ammonium bifluoride salt ($NH_4HF_2$) with hydrochloric acid (HCl) in the formation.

Embodiments of the present techniques implement a recipe for an in-situ mixture for sandstone acidizing. In particular, ammonium salts (a first ammonium salt and a second ammonium salt) and nitrite salt are pumped to the target formation, followed by pumping acid into the formation, to generate HF among other useful products (e.g., nitrogen gas and heat) generated from the reaction between the ammonium salts, nitrite salt, and provided acid. The $H^+$ ion from the provided acid may participate in the reaction. For instance, with the added acid as HCl, the $H^+$ ion from the HCl may pair with an $F^-$ ion from the ammonium bifluoride salt to give HF.

Other than generating HF, the reaction may generate heat and nitrogen gas. The heat may be useful to mobilize the organic damaging deposits such as wax and asphaltene, and remove them from the formation. The nitrogen gas may increase the pressure in the wellbore, and therefore, may beneficially displace the chemicals deeper into the formation. Furthermore, the in-situ generated nitrogen and associated increase pressure may aid (promote) the flowback of the well after the acidizing operation.

In implementations, the components of [a] a first ammonium salt as ammonium salt (e.g., $NH_4Cl$) not having fluoride, [b] a second ammonium salt as an ammonium salt having fluoride (e.g., $NH_4HF_2$ or $NH_4F$), and [c] a nitrite salt (e.g., $NaNO_2$) are pumped from surface through the wellbore into the subterranean formation (sandstone reservoir). These two ammonium salts may react with the nitrite salt to generate heat and $N_2$, as well as some HF in certain implementations. Formation temperature can promote the reaction.

Then, an acid is pumped from surface through the wellbore into the subterranean formation to be a reactant component of the in-situ mixture for the reacting mixture to generate HF, and in which the provided acid may also further promote the generation of heat and $N_2$. The reaction of the ammonium salts (including in particular the ammonium salt having fluoride) with the nitrite salt and the provided acid generates HF. The generated heat may promote generation of the HF. In implementations, the provided acid (e.g., hydrochloric acid, acetic acid, etc.) may work in conjunction with the in-situ generated HF to acidize the sandstone formation. Lastly, the presence of the provided acid may also beneficially reduce or prevent precipitation of calcium scale precipitate as a by-product of the reaction during the acidizing treatment.

As constrained by amounts of the components pumped from surface, the in-situ aqueous mixture may have, for example, the first ammonium salt (ammonium salt not having fluoride) in a range of 10 wt % to 25 wt %, the second ammonium salt (ammonium salt having fluoride) in the range of 1 wt % to 10 wt %, the nitrite salt in the range of 10 wt % to 25 wt %, and the provided acid in the range of 5 wt % to 20 wt %. The first ammonium salt may be, for example, ammonium chloride, ammonium bromide, ammonium nitrate, ammonium nitrite, ammonium sulfate, ammonium carbonate, or ammonium hydroxide, or any combinations thereof. The second ammonium salt may include, for example, $NH_4HF_2$ or $NH_4F$, or both. The nitrite salt may include, for example, sodium nitrite or potassium nitrite ($KNO_2$), or both. The provided acid may include, for example, hydrochloric acid, acetic acid, citric acid, formic acid, ethylenediaminetetraacetic acid (EDTA), or any combinations thereof.

As discussed below in particular scenarios (see, e.g., Equations 1 and 2 below), the four components $NH_4Cl$, $NH_4HF_2$ (or $NH_4F$), $NaNO_2$, and acid (e.g., HCl, acetic acid, etc.) are provided as an in-situ mixture in the sandstone reservoir in which all four components react as four respective reactants in the mixture to generate heat, $N_2$, and HF (and water). The $H^+$ ion from the provided acid may participate in the reaction(s). In implementations, the provided acid is generally added last, or at least after the $NH_4Cl$, $NH_4HF_2$ (or $NH_4F$), and $NaNO_2$. The heat and $N_2$ may be generated in-situ from the mixture before and after the provided acid is added. HF may be generated in-situ from the mixture before and after the provided acid is added. The $NH_4Cl$ and $NH_4HF_2$ (or $NH_4F$) may react with the $NaNO_2$ to generate $N_2$, heat, and HF. Then, after addition of the provided acid, the acid (at least the $H^+$ ion of the provided acid) may further promote generation of $N_2$, heat, and HF by the NH$_4$Cl and NH$_4$HF$_2$ (or NH$_4$F) reacting with the NaNO$_2$, and with the provided acid relevant in the reaction(s).

One example scenario is indicated with Equation 1 below, in which ammonium chloride (NH$_4$Cl) salt, ammonium bifluoride (NH$_4$HF$_2$) salt, sodium nitrite (NaNO$_2$) salt, and acid (e.g., HCl, acetic acid, etc.) as reactants are combined in-situ in the sandstone formation to generate water, N$_2$, heat, and HF. In implementations, the NH$_4$Cl may generally not be directly involved in a reaction to generate HF, but drives reaction to generate the heat and N$_2$.

The characterization can be that NH$_4$Cl salt, NH$_4$HF$_2$ salt, and NaNO$_2$ salt as reactants are combined in-situ in the sandstone formation to generate water, N$_2$, and heat, and then the acid added for HF generation. Other characterizations are applicable. The presence of the provided acid may further promote generation of water, N$_2$, and heat from the three initial reactants NH$_4$Cl, NH$_4$HF$_2$, and NaNO$_2$.

The NH$_4$Cl and NH$_4$HF$_2$ are shown together in parenthesis in Equation 1 below because those two components generally do not react with each other and thus can be combined (mixed) at Earth surface and pumped together into the wellbore to the sandstone formation. The NaNO$_2$ may be pumped with or after the pumping of the NH$_4$Cl and NH$_4$HF$_2$. The provided acid is generally pumped into the wellbore to the sandstone formation after the pumping of the NH$_4$Cl, NH$_4$HF$_2$, and NaNO$_2$. Equation 1:

Another example scenario is with Equation 2 below. This scenario is similar to the Equation 1 scenario, except that ammonium fluoride (NH$_4$F) salt is utilized instead of NH$_4$HF$_2$. The components NH$_4$Cl, NH$_4$F, NaNO$_2$, and provided acid as reactants are combined (mixed) in-situ in the sandstone formation to generate water, N$_2$, heat, and HF. A characterization can be that the components NH$_4$Cl, NH$_4$F, and NaNO$_2$ as reactants are combined (mixed) in-situ in the sandstone formation to generate water, N$_2$, and heat, and then acid (e.g., HCl, acetic acid, etc.) added to give generation of HF. The presence of the acid may further promote generation of the water, N$_2$, and heat from reaction of the three initial reactants NH$_4$Cl, NH$_4$F, and NaNO$_2$. The NH$_4$Cl and NH$_4$F are shown together in parenthesis in Equation 2 below because those two components generally do not react with each other and thus can be combined (mixed) at Earth surface and pumped together into the wellbore to the formation. The NaNO$_2$ can be pumped with or after the pumping of the NH$_4$Cl and NH$_4$F. The acid (e.g., HCl, acetic acid, etc.) is generally pumped into the wellbore to the sandstone formation after the pumping of the NH$_4$Cl, NH$_4$F, and NaNO$_2$. Equation 2:

The generation of HF can be significant in sandstone acidizing (e.g., see Example 2 below). The generated HF may improve the permeability of sandstone as HF generally react with the formation contents. The generation of heat (e.g., see Example 1 below) may facilitate (promote) removal of formation damage that is organic deposits, such as asphaltene and wax. Asphaltene melts between approximately 80° C. and 90° C., and wax melts between approximately 40° C. and 60° C. The generated heat may be generally give adequate temperature to mobilize and remove the organic deposits from the well. The generation of N$_2$, which is inert and generally does not cause damage to the formation, may increase pressure (wellbore pressure and near-wellbore pressure) giving further displacement of the mixture into the formation and thus improving results (increasing coverage or application of acidizing and thus resulting in increasing subsequent hydrocarbon production from the sandstone formation). Moreover, the generated nitrogen gas may advance (aid, ease) flowback from the well (sandstone formation and wellbore) after the acidizing treatment.

Thus, to perform acidizing of the sandstone formation may involve to generate (e.g., in situ in the formation) HF, heat, and N$_2$ (and increased pressure via generation of the N$_2$), and in which the HF may acidize the formation and the heat may promote the acidizing and removal or organic deposits. The generated N$_2$ and associated pressure further displaces the reacting mixture for acidizing into the sandstone formation in a direction away from the wellbore or away from the portion of the formation that initially receives the reacting mixture prior to the pressure increase. Acidizing the sandstone formation may dissolve fine sand (quartz), feldspar, and clay particles that are blocking or restricting flow through pore spaces, thereby allowing the formation fluids to move more freely from the sandstone formation into the wellbore and to the surface.

Figure 1:
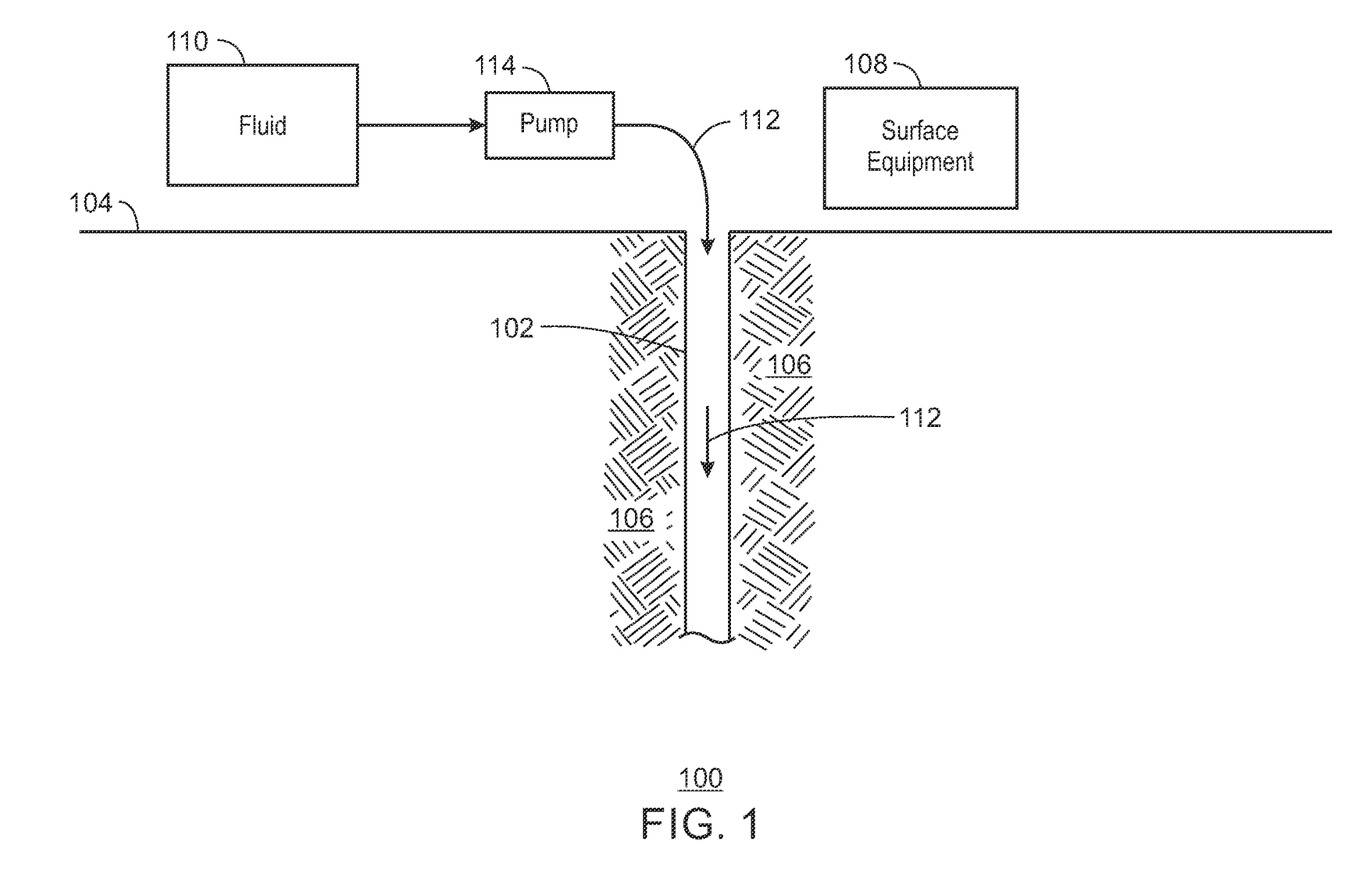
FIG. 1 is a block flow diagram of a well site having a formed through the Earth surface into a subterranean formation in the Earth crust.

FIG. 1 is a well site 100 having a wellbore 102 formed through the Earth surface 104 into a subterranean formation 106 in the Earth crust. The subterranean formation 106 may be labeled as a geological formation, reservoir formation, reservoir, hydrocarbon reservoir, oil reservoir, rock formation, hydrocarbon formation, and the like. Hydrocarbons in the subterranean formation 106 may include crude oil or natural gas, or both. The wellbore 102 can be vertical, horizontal, or deviated. The wellbore 102 can be openhole but is generally a cased wellbore. The annulus between the casing and the formation 106 may be cemented. Perforations may be formed through the casing and cement into the formation 106. The perforations may allow both for flow of fluid (e.g., pumped injected fluid) into the subterranean formation 106 and for flow of fluid (e.g., produced fluid) from the subterranean formation 106 into the wellbore 102. The surface equipment 108 may include equipment to support the pumping (injection) of fluid into the subterranean formation 106 and the production of fluid from the subterranean formation 106.

The well site 100 may include one or more sources 110 of fluid 112 (treatment fluid) at the surface 104 near or adjacent the wellbore 102 for acidizing the subterranean formation 106. The source 110 may include one or more vessels holding the fluid 112. The fluid 112 may be held in vessels or containers on ground, on a vehicle (for example, truck or trailer), or skid-mounted. The fluid 112 may be, for example, water-based. In the sequence of pumping the fluid 112 for the acidizing, the fluid 112 (components in the fluid 112) may change, as discussed below.

The well site 100 may include motive devices such as one or more pumps 114 to pump (inject) the fluid 112 through the wellbore 102 into the subterranean formation 106. The pumps 114 may be, for example, positive displacement pumps and arranged in series or parallel. Again, the wellbore 102 may be a cemented cased wellbore and have perforations for the fluid 112 to flow (injected) into the formation 106. In some implementations, the speed of the pumps 114 may be controlled to give desired flow rate of the injection fluid 112. The system may include a control device to modulate or maintain the flow of injection fluid 112 into the wellbore 102 for the acidizing. The control device may be, for example, a control valve(s). In certain implementations, as indicated, the control device may be the pump(s) 114 as a metering pump in which speed of the pump 114 is controlled to give the desired or specified flow rate of the fluid 112. The set point of the control device may be manually set or driven by a control system.

The pump 114 may be operationally coupled to the source 110 (e.g., vessel) to provide the injection fluid 112 through the wellbore 102 into the subterranean formation 106, such as for acidizing the formation 106. The fluid 112 may be prepared (formulated and mixed) offsite prior to disposition of the fluid 112 into the source 110 vessel at the well site 100. A portion (some components) of the fluid 112 may be mixed offsite and disposed into the source 110 vessel and the remaining portion (remaining components) of the fluid 112 added to the source 110 vessel or to a conduit conveying the fluid 112. The fluid 112 may be prepared onsite with components added to (e.g., and batch mixed in) the source 110 vessel. Components may be added online to the source 110 vessel or to a conduit conveying the injection fluid 112 during the injection. In particular implementations, parameters adjusted may include at least pump(s) 514 flow rate, component (additive) concentrations in the fluid 112, and any on-line component addition rates (if implemented) to the fluid 112. Injection operations can be manual or guided with controllers. The well site 100 may include a control system that supports or is a part of the pumping (injection) system including the source 110 and the pump 114.

For the subterranean formation 106 as a sandstone reservoir, implementations for acidizing the sandstone formation can be congruent with Equation (1) or Equation (2) discussed above, or with similar equations. Fluids 112 are pumped into the formation 106 to give in-situ generation of water, nitrogen gas, heat, and HF. As mentioned, in the sequence of pumping the fluid 112 for the acidizing, the fluid 112 (components in the fluid 112) may change. In certain implementations, three fluids 112 are pumped in sequence to give the mixture in the formation 106. The in-situ reaction of the mixture gives water, nitrogen gas, heat, and HF.

The first fluid 112 pumped through the wellbore 102 into the formation 106 (sandstone formation) may include water having two or more ammonium salts dissolved in the water. The two or more ammonium salts can include both an ammonium salt not having fluoride and an ammonium salt having fluoride. The ammonium salt not having fluoride may be, for example, ammonium chloride, ammonium bromide, ammonium nitrate, ammonium nitrite, ammonium sulfate, ammonium carbonate, or ammonium hydroxide, or any combinations thereof. As discussed, the ammonium salt having fluoride may include, for example, $NH_4HF_2$ or $NH_4F$, or both. In examples, the ammonium salt having fluoride can be characterized as an acid (HF) precursor.

At the conclusion of pumping of the first fluid 112 into the formation 106, the second fluid 112 pumped (after the first fluid 112) may include water having a nitrite salt dissolved in the water. The nitrite salt may be, for example, sodium nitrite or potassium nitrite, or both. The intermediate mixture in the formation 106 of the two ammonium salts and the nitrite salt can react to generate in-situ heat and $N_2$. The formation 106 temperature (e.g., above 70° C.) may help to trigger the reaction to generate the heat and $N_2$. The formation 106 temperature may be, for example, in the range of 70° C. to 100° C.

At the conclusion of pumping of the second fluid 112 into the formation 106, the third fluid 112 pumped (after the second fluid 112) may include an aqueous acid. The acid may be, for example, hydrochloric acid, acetic acid, citric acid, formic acid, EDTA, or any combinations thereof. This provided acid as a reactant may mix with the ammonium salts and the nitrite salt as reactants to give in-situ generation of heat, $N_2$, and hydrofluoric acid.

In some implementations, the sequence may be two fluids 112 instead of three fluids 112. In the two-fluid sequence, the first fluid 112 may be water having the aforementioned two or more ammonium salts and the nitrite salt dissolved in the water. The reaction of the ammonium salts with the nitrite salt may be weak (any extent of reaction may be relatively low) at surface 104 temperature (e.g., less than 35° C.). If desired, the an aqueous solution of the nitrite salt (nitrite salt dissolved in water) may be added on-the-fly to the pump 114 suction or discharge conduits conveying the water with two dissolved ammonium salts. In implementations, reaction of the two ammonium salts with the nitrite salt may not become significant until this first fluid 112 (intermediate mixture) is exposed to formation 106 temperature. After pumping of this first fluid 112 through the wellbore 102 into the formation 106, the second fluid 112 pumped through the wellbore 102 into the formation 106 may be the aforementioned provided acid.

Whether the two-fluid sequence or three-fluid sequence is implemented, the in-situ generated hydrofluoric acid may acidize the sandstone formation. For example, the hydrofluoric acid may dissolve minerals to increase permeability of the formation 106. The minerals in the sandstone formation dissolved may include, for example, quartz, feldspars, and clays. The speed of the reaction and dissolution of the minerals may depend on their reaction rate with the hydrofluoric acid and the exposed surface areas.

Quartz is generally a hard, crystalline mineral composed of silica (silicon dioxide of $SiO_2$). The atoms are linked in a continuous framework of $SiO_4$ silicon-oxygen tetrahedra, with each oxygen being shared between two tetrahedra, giving an overall chemical formula of $SiO_2$. In implementations, the reaction of the in-situ generated hydrofluoric acid with quartz in the formation 106 to dissolve the quartz can give, for example, silicon tetrafluoride ($SiF_4$) gas and water, or hexafluorosilicic acid ($F_6H_2Si$) and water, and the like.

The in-situ generated heat may facilitate removal of formation damage, such as organic deposits, to increase permeability of the formation 106. The organic deposits may be, for example, wax or asphaltene, or both. The provided acid as a reactant for the mixture to generate hydrofluoric acid may additionally promote removal of the formation damage, as well as promote in conjunction with the hydrofluoric acid the dissolution of minerals. As discussed, the in-situ generate nitrogen may increase pressure to displace the reacting mixture further into the sandstone formation, thereby beneficially extending application (coverage) of the acidizing to more of the formation (more volume and surface area of the formation). Moreover, the nitrogen generation may also advantageously promote flowback of the spent mixture at the conclusion of the acidizing. The flowback may be the production of the spent mixture (having the spent reactants, byproducts, dissolved mineral products, etc.) from the formation 106 to through the wellbore 102 to the surface 104.

Figure 2:
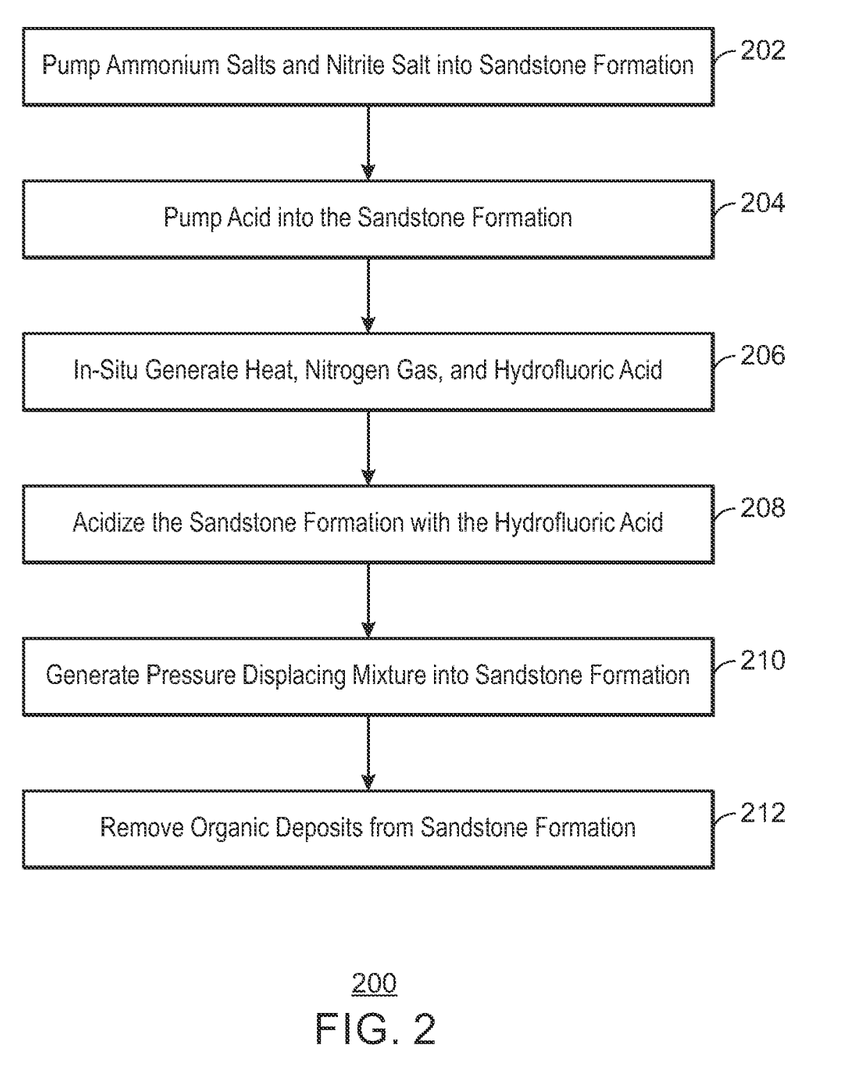
FIG. 2 is a block flow diagram of a method of acidizing a sandstone formation in the Earth crust.

FIG. 2 is a method of acidizing a sandstone formation in the Earth crust. At block 202, the method includes pumping ammonium salts and nitrite salt through a wellbore into a subterranean formation, wherein the subterranean formation is or includes sandstone formation. The nitrite salt may include, for example, sodium nitrite or potassium nitrite, or both. In implementations, the pumping of the ammonium salts and the nitrite salt may involve first pumping the ammonium salts through the wellbore into the subterranean formation, and then pumping the nitrite salt through the wellbore into the subterranean formation after pumping the ammonium salts through the wellbore into the subterranean formation.

The ammonium salts may include both an ammonium salt not having fluoride and an ammonium salt having fluoride. The ammonium salt not having fluoride may include, for example, ammonium chloride, ammonium bromide, ammonium nitrate, ammonium nitrite, ammonium sulfate, ammonium carbonate, or ammonium hydroxide, or any combination thereof. The ammonium salt having fluoride may include, for example, ammonium bifluoride ($NH_4HF_2$) or ammonium fluoride ($NH_4F$), or both.

At block 204, the method includes pumping an acid through the wellbore into the subterranean formation after pumping the ammonium salts and the nitrite salt through the wellbore into the subterranean formation. The acid may include, for example, hydrochloric acid, acetic acid, citric acid, formic acid, ethylenediaminetetraacetic acid (EDTA), or any combinations thereof. As constrained by amounts of the components pumped from surface, the in-situ aqueous mixture may have, for example, the ammonium salt not having fluoride in a range of 10 wt % to 25 wt %, the ammonium salt having fluoride in the range of 1 wt % to 10 wt %, the nitrite salt in the range of 10 wt % to 25 wt %, and the pumped acid (block 204) in the range of 5 wt % to 20 wt %.

At block 206, the method includes the in-situ generating of heat, nitrogen gas, and hydrofluoric acid from reaction of the ammonium salts with the nitrite salt and the acid in the subterranean formation.

At block 208, the method includes acidizing the sandstone formation with the hydrofluoric acid, wherein acidizing involves dissolving quartz in the sandstone formation with the hydrofluoric acid as generated. The acidizing (including dissolving the quartz) may increase permeability of the sandstone formation.

At block 210, the generating of the nitrogen gas may increase pressure in the wellbore (and in the near wellbore region), thereby displacing the hydrofluoric acid (the reacting mixture) further into the sandstone formation in a direction away from the wellbore. Such may beneficially increase coverage of the acidizing of the sandstone formation.

At block 212, the method may include removing organic deposits from the sandstone formation via the heat as generated and the acid. The organic deposits may include, for example, wax or asphaltene, or both.

Lastly, the wellbore pressure (and near wellbore pressure) as increased via generating of the nitrogen gas (block 210) may facilitate flowback of acidizing components at the conclusion of the acidizing treatment. The flowback may involve producing (via the pressure) the acidizing components from the sandstone formation through the wellbore to the Earth surface.

An embodiment includes a method of acidizing a sandstone formation in the Earth crust. The method includes pumping ammonium salts and nitrite salt (e.g., sodium nitrite or potassium nitrite, or both) through a wellbore into a subterranean formation (including a sandstone formation). The ammonium salts include an ammonium salt not having fluoride and an ammonium salt having fluoride (e.g., $NH_4HF_2$ or $NH_4F$, or both). The ammonium salt not having fluoride may include, for example, ammonium chloride, ammonium bromide, ammonium nitrate, ammonium nitrite, ammonium sulfate, ammonium carbonate, or ammonium hydroxide, or any combination thereof. In implementations, the pumping of the ammonium salts and the nitrite salt can be pumping the ammonium salts through the wellbore into the subterranean formation, and pumping the nitrite salt through the wellbore into the subterranean formation after pumping the ammonium salts through the wellbore into the subterranean formation. The method includes pumping an acid through the wellbore into the subterranean formation after pumping the ammonium salts and the nitrite salt through the wellbore into the subterranean formation. The acid may include, for example, hydrochloric acid, acetic acid, citric acid, formic acid, or EDTA, or any combinations thereof. The method includes generating (e.g., in-situ in the formation) heat, nitrogen gas, and hydrofluoric acid from reaction of the ammonium salts with the nitrite salt and the acid in the subterranean formation. The method includes acidizing the sandstone formation with the hydrofluoric acid, wherein the acidizing includes dissolving quartz in the sandstone formation with the hydrofluoric acid (e.g., as generated). In implementations, the generating of the nitrogen gas increases pressure in the wellbore, thereby displacing the hydrofluoric acid further into the sandstone formation in a direction away from the wellbore. The method may include removing organic deposits from the sandstone formation via the heat as generated and the acid (pumped from Earth surface).

Another embodiment is a method of acidizing a sandstone formation, including pumping an ammonium salt not having fluoride (e.g., see specific salts previously mentioned), an ammonium salt having fluoride (e.g., $NH_4HF_2$ or $NH_4F$, or both), and a nitrite salt (e.g., $NaNO_2$ or $KNO_2$, or both) through a wellbore into a subterranean formation in Earth crust, wherein the wellbore is formed through Earth surface into the subterranean formation, and wherein the subterranean formation is or includes a sandstone formation. In implementations, the pumping of the ammonium salts and the nitrite salt may include pumping the ammonium salts together dissolved in water (e.g., without nitrite salt) through the wellbore into the subterranean formation, and pumping the nitrite salt dissolved in water (e.g., without ammonium salts) through the wellbore into the subterranean formation after pumping the ammonium salts through the wellbore into the subterranean formation. The method includes pumping an acid (e.g., in water) through the wellbore into the subterranean formation. The acid pumped into the formation may include one or more of the pumped acids previously mentioned. The method includes generating heat, nitrogen gas, and hydrofluoric acid from reaction of the ammonium salt not having fluoride, the ammonium salt having fluoride, the nitrite salt, and the acid. The method includes acidizing the sandstone formation with the hydrofluoric acid, wherein the acidizing includes dissolving quartz in the sandstone formation with the hydrofluoric acid as generated. In implementations, the generating of the nitrogen gas increases pressure of the wellbore. Further, in implementations, at conclusion of the acidizing, the pressure (as generated) of the wellbore facilitates flowback of acidizing components through the wellbore to the Earth surface.

Yet another embodiment is a method of acidizing a sandstone formation in Earth crust. The method includes pumping a first ammonium salt and a second ammonium salt through a wellbore into a subterranean formation, wherein the subterranean formation is or includes the sandstone formation. The first ammonium salt and the second ammonium salt may be pumped together in water, both dissolved in the water. The first ammonium salt may include, for example, ammonium chloride, ammonium bromide, ammonium nitrate, ammonium nitrite, ammonium sulfate, ammonium carbonate, or ammonium hydroxide, or any combinations thereof. The second ammonium salt may include $NH_4HF_2$ or $NH_4F$, or both. The method includes pumping a nitrite salt (e.g., $NaNO_2$ or $KNO_2$, or both, dissolved in water) through the wellbore into the subterranean formation after pumping the first ammonium salt and the second ammonium salt through the wellbore into a subterranean formation. The method includes pumping an acid (e.g., in water) through the wellbore into the subterranean formation after pumping the nitrite salt through the wellbore into the subterranean formation to give a mixture of water, the first ammonium salt, the second ammonium salt, the nitrite salt, and the acid in the sandstone formation. As discussed, the acid may be HCl, acetic acid, citric acid, formic acid, or EDTA, or any combinations thereof. The method includes generating heat, nitrogen gas, and hydrofluoric acid from reaction of the first ammonium salt, the second ammonium salt, the nitrite salt, and the acid. In implementations, the generating of the nitrogen gas increases pressure in the wellbore, thereby displacing the mixture further into the sandstone formation in a direction away from the wellbore. The method includes acidizing the sandstone formation with the hydrofluoric acid, wherein the acidizing includes dissolving quartz in the sandstone formation with the hydrofluoric acid as generated.

EXAMPLES

The Examples are given as examples and not intended to limit the present techniques. Example 1, Example, 2, and Example 3 are presented.

Example 1

Ammonium salts (ammonium chloride and ammonium bifluoride) and nitrite salt (sodium nitrite) as reactants were added in solid form to water and then dissolved in the water to give an aqueous mixture in a close reaction system. Then, acid (hydrochloric acid) was added as a reactant to the mixture in the closed reaction system. The concentrations in the mixture in the closed reaction system were ammonium chloride at 17 weight percent (wt %), ammonium bifluoride at 3 wt %, sodium nitrite at 20 wt %, and HCl at 9 wt %. The closed reaction system is an apparatus utilized to conduct chemical reactions. The apparatus included a container closable with a tied cap, had a pressure gauge and a temperature gauge, and had valves for addition of chemicals and control. This test in Example 1 was to examine at least the behavior of reaction between the ammonium salts and the nitrite salt. The test showed increase in temperature from room temperature up to 90° C., and increase in pressure from atmospheric to more than 400 pounds per square inch gauge (psig).

Figure 3:
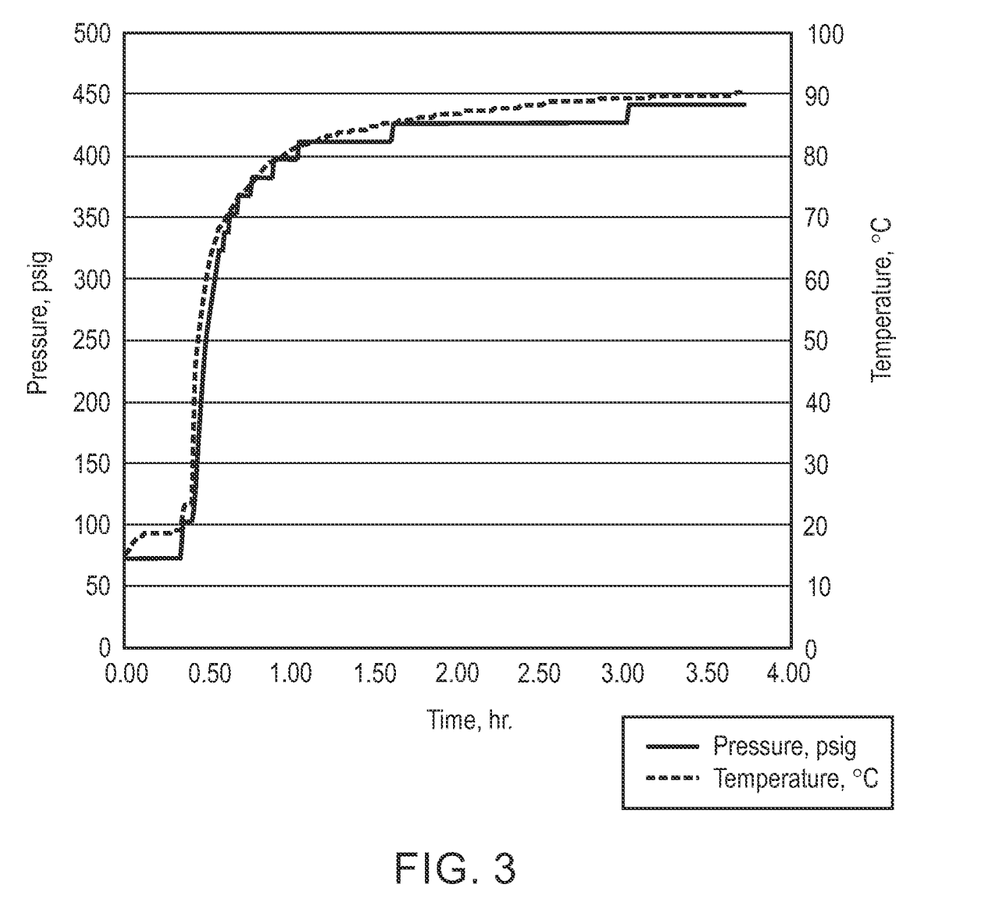
FIG. 3 is a plot of pressure and temperature over time for a mixture in the closed reaction system of Example 1.

FIG. 3 is a plot of pressure (psig) and temperature (° C.) over time (hours) for the mixture in the closed reaction system. The behavior of the reaction between the ammonium salts with the nitrite salt, including after the addition of acid, is indicated. At time=0.00, the ammonium salts and the nitrite salt are added to the container of the closed reaction system. At approximately time=0.40 hour, the acid (hydrochloric acid) was added to the container. As can be seen in FIG. 3, an initial sharp increase in pressure and temperature occur beginning at the time of addition of the acid.

Example 2

A 40-milliliter (ml) sample of the mixture of Example 1 in the closed reaction system after the addition of the hydrochloric acid was collected. A quartz ($SiO_2$) sample was added to the 40-ml sample of the mixture (see FIG. 4). This test in Example 2 included considering generation of HF by the mixture (from Example 1) and dissolution of the added quartz sample with the generated HF. Analysis of the 40-ml sample of the mixture (from Example 1) by inductively coupled plasma mass spectrometry (ICP-MS) showed no presence of silicon (Si) in the mixture. The amount of Si in the collected mixture as measured was 0 part per million by weight (ppmw). The amount of Si in the mixture, as analyzed via ICP-MS, increased to 44 ppmw after giving time (about 2 hours) for the quartz to dissolve. Only a portion of the quartz dissolved. Likewise, in the acidizing in the field in the sandstone formation, only a moderate or relatively small amount of quartz is dissolved because significant dissolution of quartz beyond unplugging fouled pores could be problematic for the well in leading to an unconsolidated formation. In any case, the conclusion of Example 2 is that the mixture generated hydrofluoric acid in Example 1, and the generated hydrofluoric acid reacted with the added quartz sample to dissolve quartz in Example 2.

Figure 4:
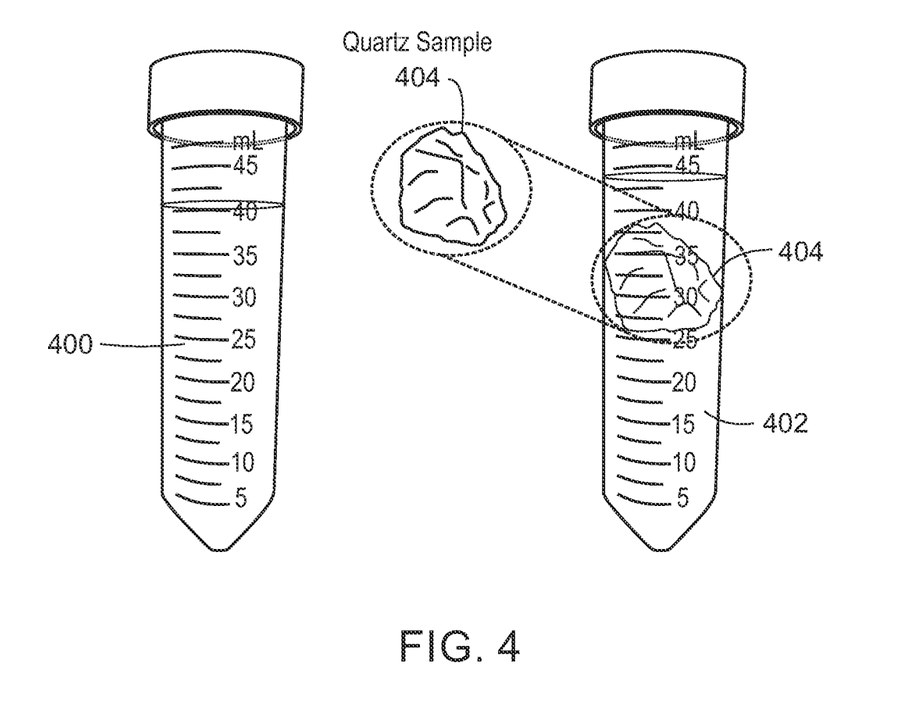
FIG. 4 is a diagrammatical representation of a test tube having a sample of the Example 1 mixture utilized in Example 2.

FIG. 4 is representations 400, 402 of a test tube. The representation 400 is the test tube having the 40-ml sample of the mixture as collected from Example 1 (from the closed reaction system) and with no measured presence of Si in the mixture. The representation 402 is the test tube having the 40-ml sample of the mixture with the quartz sample 404 added to the mixture in the test tube. As described, a portion of the quartz sample 404 dissolved, and the mixture in the test tube then had 44 ppmw of Si.

Example 3

A core flooding test of a sandstone rock sample was performed utilizing the mixture (after addition of the hydrochloric acid) from Example 1 (from the closed reaction system). This core flooding test was to consider the change (increase) in permeability of a sandstone rock sample after (in response to) the sandstone rock sample being treated with the mixture from Example 1.

Core flood or core flooding may be a test to determine permeability of a core sample as placed in a core holder, injected with fluid, and subjected to triaxial stress. Core flood is an instrument that holds core sample (cylindrically cut rock) under reservoir conditions and allows flow of the liquid through the rock pores. Core flooding is a test with liquid transported through the pores of the rock sample. Measurement allows to quantify if flow of liquid through the rock pores cause damage to the rock (for example, plugs pores, reduces size of the pores, or damages porous structure) and if there is a temporary or permanent retention of the liquid to the surface of the rock.

As mentioned, the core flooding test in Example 3 was to evaluate the increase in permeability of a sandstone rock sample treated with the mixture from Example 1. A core of the sandstone rock sample was prepared and placed in the core holder. The core flooding apparatus included a fluid container and pump in addition to the core holder. The Example 1 mixture was placed into the fluid container of the core flooding. The pump was utilized to inject the Example 1 mixture from the container into the core sample (sandstone rock sample) to test the effect of the mixture on the sandstone rock sample. Pressure and temperature were applied on the sandstone rock sample placed on the core holder to mimic typical sandstone reservoir conditions. The core flooding test was conducted at pressure of approximately 2000 psig and a temperature of approximately 150° F. (66° C.) to mimic a typical sandstone reservoir condition.

First (a first stage), water having ammonium chloride ($NH_4Cl$) at 5 wt % (labeled as brine) was initially injected into the sandstone rock sample (core sample) on the core holder. This initial injection of brine was to give base line permeability of the sandstone rock sample prior to treatment with the Example 1 mixture. Second (a second stage), the Example 1 mixture was injected into the sandstone rock sample on the core holder as the treatment. Third (a third stage), brine (water having $NH_4Cl$ at 5 wt %) was injected after the injection of the Example 1 mixture to compare the permeability of the sandstone rock sample before and after injection of the Example 1 mixture. The core flooding test showed an increase in permeability if about 4% as reflected by the collected data depicted in FIG. 5.

Figure 5:
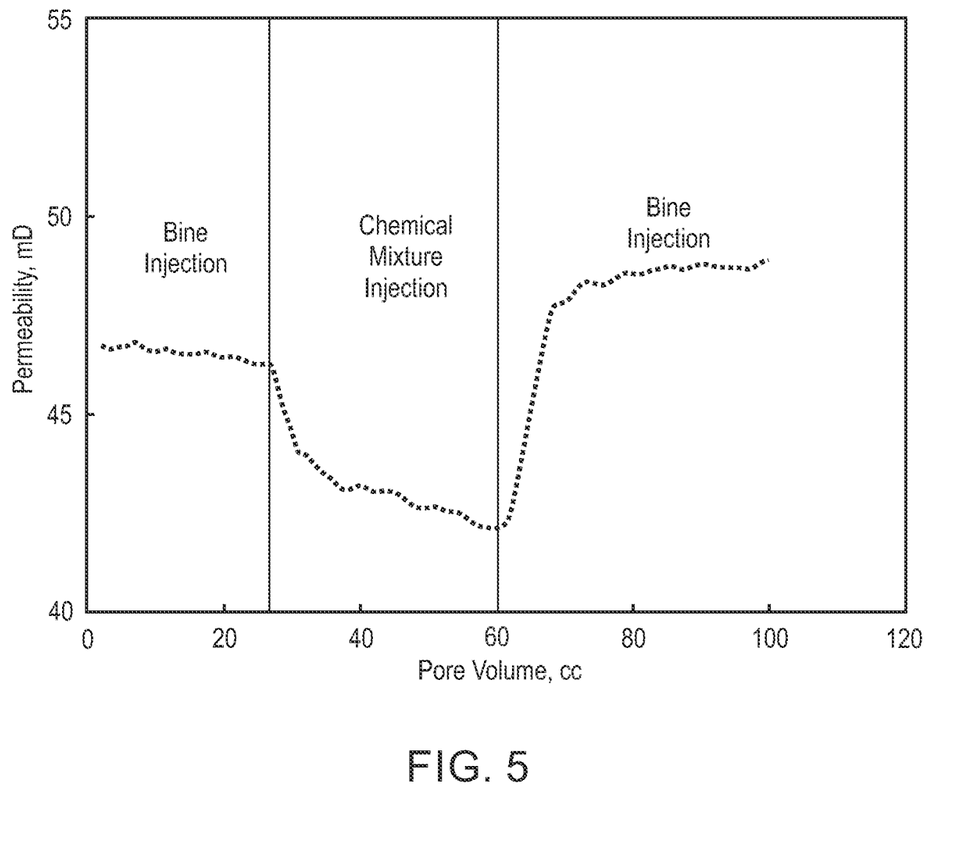
FIG. 5 is a plot of permeability of a sandstone rock sample versus pore volume of the sandstone rock sample in Example 3.

FIG. 5 is a plot of permeability in millidarcy (mD) of the sandstone rock sample versus pore volume in cubic centimeter (cc) of the sandstone rock sample over the three stages of data collected in the core flooding. As discussed, the first stage was the initial brine injection, the second stage was the injection of the Example 1 mixture, and the third stage was the final brine injection. The plot in FIG. 5 is a type of graph that can be utilized to indicate the change in permeability (y-axis is absolute values of permeability) of the rock sample. The amount of fluid injected through the rock sample is indicated via the x-axis, with this amount of fluid measured with pore volume of the rock sample. Therefore, the injected liquid in amount of pore volume (in $cm^3$, cc) is injected through the rock to obtain the change in permeability by the injection of the fluids. As can be seen in FIG. 5, the permeability increase from about 46.5 mD to 48.5 mD, giving an approximate 4% increase in permeability.

A number of implementations have been described. Nevertheless, it will be understood that various modifications may be made without departing from the spirit and scope of the disclosure.

What is claimed is:

1. A method of acidizing a sandstone formation in Earth crust, comprising:
   pumping ammonium salts and nitrite salt through a wellbore into a subterranean formation, wherein the subterranean formation comprises a sandstone formation, and wherein the ammonium salts comprise an ammonium salt not having fluoride and an ammonium salt having fluoride;
   generating heat, nitrogen gas, and hydrofluoric acid from reaction of the ammonium salts with the nitrite salt in the subterranean formation;
   pumping an acid through the wellbore into the subterranean formation after conclusion of pumping the ammonium salts and the nitrite salt through the wellbore into the subterranean formation;
   generating heat, nitrogen gas, and hydrofluoric acid from reaction of the ammonium salts with the nitrite salt and the acid in the subterranean formation; and
   acidizing the sandstone formation with the hydrofluoric acid, wherein the acidizing comprises dissolving quartz in the sandstone formation with the hydrofluoric acid.

2. The method of claim 1, wherein pumping the ammonium salts and the nitrite salt comprises pumping the nitrite salt through the wellbore into the subterranean formation after conclusion of pumping the ammonium salts through the wellbore into the subterranean formation.

3. The method of claim 1, wherein the ammonium salt not having fluoride comprises ammonium chloride, ammonium bromide, ammonium nitrate, ammonium nitrite, ammonium sulfate, ammonium carbonate, or ammonium hydroxide, or any combination thereof, wherein the ammonium salt having fluoride comprises ammonium bifluoride ($NH_4HF_2$) or ammonium fluoride ($NH_4F$), or both, and wherein the nitrite salt comprises sodium nitrite or potassium nitrite, or both.

4. The method of claim 3, wherein the acid does not comprise hydrochloric acid.

5. The method of claim 3, wherein the acid comprises hydrochloric acid, acetic acid, citric acid, formic acid, or ethylenediaminetetraacetic acid (EDTA), or any combinations thereof.

6. The method of claim 3, wherein the acid comprises acetic acid, citric acid, formic acid, or ethylenediaminetetraacetic acid (EDTA), and wherein generating the nitrogen gas increases pressure in the wellbore, thereby displacing the hydrofluoric acid further into the sandstone formation in a direction away from the wellbore.

7. The method of claim 3, comprising removing organic deposits from the sandstone formation via the heat as generated and the acid, wherein pumping the ammonium salts and the nitrite salt into the subterranean formation and pumping the acid into the subterranean formation gives an in-situ aqueous mixture in the subterranean formation comprising the ammonium salt not having fluoride in a range of 10 weight percent (wt %) to 25 wt %, the ammonium salt having fluoride in a range of 1 wt % to 10 wt %, the nitrite salt in a range of 10 wt % to 25 wt %, and the acid in a range of 5 wt % to 20 wt %.

8. A method of acidizing a sandstone formation, comprising:
   pumping an ammonium salt not having fluoride, an ammonium salt having fluoride, and a nitrite salt through a wellbore into a subterranean formation in Earth crust, wherein the wellbore is formed through Earth surface into the subterranean formation, and wherein the subterranean formation comprises a sandstone formation;
   generating heat, nitrogen gas, and hydrofluoric acid from reaction of the ammonium salt not having fluoride, an ammonium salt having fluoride, and the nitrile salt;
   pumping an acid through the wellbore into the subterranean formation after conclusion of pumping the ammonium salt not having fluoride, an ammonium salt having fluoride, and a nitrite salt through the wellbore into the subterranean formation;
   generating heat, nitrogen gas, and hydrofluoric acid from reaction of the ammonium salt not having fluoride, the ammonium salt having fluoride, the nitrite salt, and the acid; and
   acidizing the sandstone formation with the hydrofluoric acid, wherein acidizing comprises dissolving quartz in the sandstone formation with the hydrofluoric acid as generated.

9. The method of claim 8, wherein the ammonium salt not having fluoride comprises ammonium chloride, ammonium bromide, ammonium nitrate, ammonium nitrite, ammonium sulfate, ammonium carbonate, or ammonium hydroxide, or any combination thereof, wherein the ammonium salt having fluoride comprises ammonium bifluoride ($NH_4HF_2$) or ammonium fluoride ($NH_4F$), or both, and wherein the nitrite salt comprises sodium nitrite or potassium nitrite, or both.

10. The method of claim 9, wherein pumping the ammonium salts and the nitrite salt comprises pumping the nitrite salt through the wellbore into the subterranean formation after conclusion of pumping the ammonium salts through the wellbore into the subterranean formation, and wherein pumping the ammonium salts and the nitrite salt into the subterranean formation and pumping the acid into the subterranean formation gives an in-situ aqueous mixture in the subterranean formation comprising the ammonium salt not having fluoride in a range of 10 weight percent (wt %) to 25 wt %, the ammonium salt having fluoride in a range of 1 wt % to 10 wt %, the nitrite salt in a range of 10 wt % to 25 wt %, and the acid in a range of 5 wt % to 20 wt %.

11. The method of claim 9, wherein the acid does not comprise hydrochloric acid.

12. The method of claim 9, wherein the acid comprises hydrochloric acid, acetic acid, citric acid, formic acid, or ethylenediaminetetraacetic acid (EDTA), or any combinations thereof.

13. The method of claim 9, wherein the acid comprises acetic acid, citric acid, formic acid, or EDTA, or any combinations thereof, wherein generating the nitrogen gas increases pressure of the wellbore, and wherein at conclusion of the acidizing, the pressure of the wellbore facilitates flowback of acidizing components through the wellbore to the Earth surface.

14. A method of acidizing a sandstone formation in Earth crust, comprising:
   pumping a first ammonium salt and a second ammonium salt through a wellbore into a subterranean formation, wherein the subterranean formation comprises the sandstone formation;
   pumping a nitrite salt through the wellbore into the subterranean formation after conclusion of pumping the first ammonium salt and the second ammonium salt through the wellbore into a subterranean formation;
   pumping an acid through the wellbore into the subterranean formation after conclusion of pumping the nitrite salt through the wellbore into the subterranean formation to give a mixture of water, the first ammonium salt, the second ammonium salt, the nitrite salt, and the acid in the sandstone formation;
   generating heat, nitrogen gas, and hydrofluoric acid in the subterranean formation from reaction of the first ammonium salt and the second ammonium salt with the nitrite salt before the acid is pumped into the subterranean formation;
   generating heat, nitrogen gas, and hydrofluoric acid in the subterranean formation from reaction of the first ammonium salt, the second ammonium salt, the nitrite salt, and the acid; and
   acidizing the sandstone formation with the hydrofluoric acid as generated, wherein the acidizing comprises dissolving quartz in the sandstone formation with the hydrofluoric acid as generated.

15. The method of claim 14, wherein the first ammonium salt comprises ammonium chloride, ammonium bromide, ammonium nitrate, ammonium nitrite, ammonium sulfate, ammonium carbonate, or ammonium hydroxide, or any combinations thereof, wherein the second ammonium salt comprises ammonium bifluoride ($NH_4HF_2$) or ammonium fluoride ($NH_4F$), or both, wherein the nitrite salt comprises sodium nitrite or potassium nitrite, or both, and wherein mixture comprises an aqueous mixture comprising the first ammonium salt in a range of 10 weight percent (wt %) to 25 wt %, the second ammonium salt in a range of 1 wt % to 10 wt %, the nitrite salt in a range of 10 wt % to 25 wt %, and the acid in a range of 5 wt % to 20 wt %.

16. The method of claim 15, wherein the acid does not comprise hydrochloric acid.

17. The method of claim 14, wherein the acid comprises hydrochloric acid, acetic acid, citric acid, formic acid, or ethylenediaminetetraacetic acid (EDTA), or any combinations thereof.

18. The method of claim 14, wherein the acid comprises acetic acid, citric acid, formic acid, or EDTA, or any combinations thereof, and wherein generating the nitrogen gas increases pressure in the wellbore, thereby displacing the mixture further into the sandstone formation in a direction away from the wellbore.

* * * * *

UNITED STATES PATENT AND TRADEMARK OFFICE
CERTIFICATE OF CORRECTION

PATENT NO. : 11,913,319 B2
APPLICATION NO. : 17/845706
DATED : February 27, 2024
INVENTOR(S) : Abdullah M. Alharith and Mohammed Ali Alyami It is certified that error appears in the above-identified patent and that said Letters Patent is hereby corrected as shown below:

On the Title Page

Item (56), Column 2, Line 2, delete "Ghawwar" insert -- Ghawar --.

In the Claims

Column 14, Line 51, Claim 8, delete "nitrile" insert -- nitrite --.

Signed and Sealed this
Twenty-first Day of May, 2024

Katherine Kelly Vidal
*Director of the United States Patent and Trademark Office*